3,304,274
ANHYDROUS PROCESS FOR THE PREPARATION OF EXPANDABLE PARTICULATE STYRENE POLYMERS
Arthur A. Eng, Somerset, N.J., assignor to Union Carbide Corporation, a corporation of New York
No Drawing. Filed June 13, 1963, Ser. No. 287,520
17 Claims. (Cl. 260—2.5)

This invention relates to a process for the preparation of expandable particulate styrene polymers. More particularly, this invention relates to a rapid diffusion process for the preparation of expandable particles of styrene polymers.

Expanded polystyrene foams have found wide and diversified commercial acceptance. These foams are useful in the manufacture of toys, low cost-low temperature insulation, packaging, core materials for sandwich constructions, buoys, and the like.

Expandable polystyrene is normally produced as free-flowing beads containing an integral expanding agent. When exposed to heat, these beads can expand to over 60 times their original volume and exhibit a density as low as 1 pound per cubic foot.

Heretofore, the preparation of expandable polystyrene particles has been considered a time consuming diffusion process. For example, steeping styrene polymer particles in a volatile hydrocarbon until the particles have absorbed the desired quantity of foaming agent can take as long as 30 days. Attempts to decrease this time period have involved such modifications as the use of major portions of water and only minor portions of liquid hydrocarbon in a polystyrene suspension. This method, however, results in water removal problems as well as increases in the requisite time period due to prolonged drying. Other methods allow complete solidification of the polymer particles into one mass with the addition of a hydrocarbon and styrene monomer to the polymer particles. This method, however, results in the additional problem of granulating the solid mass to attain uniform small sized particles. Still other methods involve the use of various chemicals, polymers, or pigments added to the polystyrene particles for the purpose of increasing the diffusion rate, but the post handling of the treated particles becomes unduly complicated and prolonged.

Accordingly it is an object of the persent invention to greatly reduce the hydrocarbon diffusion time period in the formation of expandable particulate styrene polymer.

It is another object of this invention to eliminate the problems of water removal and granulating of larger masses to small particles that have heretofore existed.

In accordance with the persent invention, expandable particulate styrene polymers are prepared by a process which comprises coating particulate styrene polymer with a finely divided siliceous material, reducing the ambient pressure on the coated particulate polymer to substantially below atmospheric, admixing a low boiling liquid hydrocarbon non-solvent for the styrene polymer having a boiling point below the softening temperature of the styrene polymer with the coated particulate polymer under anhydrous conditions, heating the resulting mixture to a temperature below that which causes particle agglomeration while maintaining said heated mixture under a pressure sufficient to maintain the hydrocarbon in a liquid phase until at least about 1 percent liquid hydrocarbon has been diffused into the particulate polymer, and thereafter removing the excess hydrocarbon and recovering the expandable particulate styrene polymer.

The term "styrene polymer" as used herein and in the appended claims is descriptive of the homopolymeric polystyrene as well as copolymers of styrene with other copolymerizable monomers such as the conjugated 1,3-dienes, e.g., butadiene, isoprene, and the like, $\alpha,\beta$-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methyl acrylamide, acrylonitriles, methacrylonitrile, and the like, vinyl halides, vinyl acetate, and mixtures thereof. In any of the above type resins, all or a portion of the styrene may be replaced with its closely related homologues such as alpha-methylstyrene, ortho, meta, and para-methylstyrene, ortho, meta and para-ethylstyrenes, 2,4-diethylstyrenes, and the like. The copolymers can contain up to 75 percent of a comonomer such as exemplified above and 25 percent styrene; however, it is preferred that styrene be present in a major portion and most preferably in amounts greater than 75 percent styrene. In general, the styrene polymers employed are preferably those having a molecular weight in the range of about 30,000 to 200,000 and are not tacky or flexible at about 50° C.

Diffusion of the foaming agent into these styrene polymers is made possible in this invention without sintering or gelling the particulate styrene polymer by coating the particulate polymer with a finely divided inorganic siliceous material, preferably of a particle size less than about 150 microns although particle sizes of from .001 micron to 100 microns are considered most preferred. It is not critical what the siliceous material is since it is basically inert in this invention. For instance, inorganic siliceous materials in finely divided particle size such as metal silicates, as for example, magnesium silicate, calcium silicate, aluminum silicate, sodium silicate, and the like, finely divided silicas, diatomaceous earth, powdered quartz, siliceous aluminates such as sodium silica aluminate, and the like have been found most useful in preventing fusion of polymer particles. It has been found critical that the finely divided siliceous material be present in the original dry blending process in amounts of from about ½ to 5 percent by weight. Below ½ percent, particle agglomeration would still occur in the diffusion process whereas above 5 percent, the siliceous material precipitates during the diffusion process and particle caking occurs during the drying process. The dry blending or coating of the particulate styrene polymer and the finely divided siliceous material can be conveniently accomplished in an autoclave equipped with an agitator, a double cone blender, or any other similar blending means.

The foaming agents which render the particulate styrene polymer expandable are those liquid hydrocarbons which are low boiling non-solvents for the styrene polymers and have a boiling point below the softening temperature of the styrene polymer. Aliphatic hydrocarbons whose boiling points are below the softening temperature and are non-solvents for the styrene polymer particles are most suitable in the process of the present invention. Aliphatic hydrocarbons such as pentane, hexane, heptane, petroleum ethers, and the like and cycloaliphatics such as cyclopentane and cyclohexane, are most preferred. It has been found that the minimum amount of foaming agent required to be absorbed in the polymer to produce foaming, is about 1% by weight; however, it is considered preferable to have the foaming agent present in the polymer in amounts of from about 3 to about 8 percent by weight, although a greater percentage can also be absorbed without departing from the scope or spirit of the present invention. In order to increase the diffusion rate of the foaming agents into the particulate polymer, it is necessary to establish a concentration gradient at the interface of the polymer with the foaming agent, this can be advantageously accomplished by maintaining an excess of foaming agent surrounding the particles, e.g., by completely submerging the polymer particles in the foaming agent. While not considered critical, it has been found advantageous to have equal parts by weight of both polymer and foaming agent present in the diffusion system to insure uniform diffusion. However, lesser or greater amounts of foaming agent can be employed as long as the polymer particles are completely surrounded by liquid hydrocarbon.

In order to reduce the hydrocarbon diffusion time period, it is considered critical that prior to the addition of the liquid hydrocarbon, the entire system surrounding the coated particulate styrene polymer be maintained under essentially anhydrous conditions and in the substantial absence of air, i.e., under vacuum or sub-atmospheric pressure. It has been found in this invention that the removal of air and moisture in conjunction with the prevention of particle agglomeration by use of a finely-divided siliceous material enables rapid diffusion rates for the liquid hydrocarbon into the polymer particles to be attained. The increased diffusion rates are accounted for, at least in part, by the removal of foreign molecules which hinder the hydrocarbon diffusion and the maintenance of a large surface area to volume ratio by the prevention of agglomeration of the polymer particles. Moreover, the strict maintenance of anhydrous conditions not only reduces the diffusion time but also substantially reduces the subsequent drying time.

It has also been found that employing the highest possible processing temperatures reduces the diffusion time period. The process temperature varies according to the softening point of the particular styrene polymer employed. The preferred processing temperature is the highest temperature which can be employed without the occurrence of particle agglomeration. In general, for most styrene polymers, the process temperature is in the range of from about 35° C. to about 65° C. For example, the agglomeration temperature for polystyrene having a molecular weight range of 48,000–55,000 is 44° C. whereas polystyrene having a molecular weight range of 58,000–65,000 has an agglomeration temperature of 55° C.

It is considered critical that the liquid hydrocarbon be maintained in the liquid phase during the diffusion process in order to provide uniform treatment of the polymeric particles. This can be accomplished by maintaining the entire system described above under a pressure of from about 30 to 60 pounds per square inch. The pressurized system can be attained by employing a pressurized autoclave, employing pumps for the addition of pressurized liquid hydrocarbon, or perhaps most conveniently by employing an inert gaseous atmosphere surrounding the system. Inert gases applicable to the present invention are nitrogen, argon, carbon dioxide, and the like. Increasing the pressure on the system has also been found to increase the diffusion rate of the hydrocarbon into the polymeric particles.

Employing the process conditions set forth hereinabove, the diffusion time period is reduced to about one-half to three hours as compared to a minimum of about 15 hours as heretofore existed. After the short diffusion period, the system can be cooled to room temperature and the excess hydrocarbon can be discharged and recycled for re-use. Although any convenient dry means can be employed, it is preferred to circulate warm air at about 35° C. around the particles to drive off any excess hydrocarbon from the treated particle. The hydrocarbon vapors can be condensed and also recycled for re-use. The dried, treated styrene polymer particles can then be discharged and packed for shipping. Thus, by the present invention, water removal, granulation of large masses, and unduly prolonged diffusion and recovery time periods are successfully eliminated.

In a preferred embodiment of the present invention, a temperature controlled jacketed double cone blender with ports for hydrocarbon injection, vacuum supply, temperature measurements and warm air drying is charged with polystyrene particles and about 1% by weight of a finely divided siliceous material such as calcium silicate. The mixture is dry blended until the particulate polymer is well coated. The system is evacuated and the liquid hydrocarbon is vacuum drawn into the autoclave under anhydrous conditions until the particles are completely submerged. The temperature is gradually raised to about 40–50° C. and an inert gas such as nitrogen is injected to attain a pressure in the system of about 40–50 pounds per square inch. After a diffusion period of from ½ to 2 hours, the autoclave is cooled to about 25° C. and the excess hydrocarbon is discharged through a screened outlet for recycling. The autoclave is then reheated to about 35° C. and warm air is circulated throughout the autoclave to remove excess hydrocarbon from the treated particles. The hydrocarbon vapors can be condensed and re-used for the next cycle. The dried treated particles can then be discharged and packed for use.

The following examples are to further illustrate the present invention and are not to be construed as imposing any limitations thereon. Unless otherwise specified, all percentages and parts are by weight.

*Example I*

2,420 grams of polystyrene homopolymer having a molecular weight of 48,000 to 55,000 was dry blended with 24.2 grams of finely divided calcium silicate. This mixture was then placed in a 3 gallon jacketed autoclave equipped with an agitator under anhydrous conditions. A 26 inch Hg vacuum was drawn 3 times to remove air. 2,420 grams of normal pentane was drawn into the autoclave by vacuum. The autoclave was gradually heated to 40° C. within ½ hour and a pressure of 40 p.s.i. was applied with pressurized nitrogen gas. After ½ hour at this condition, the autoclave was cooled to 20° C. within 5 minutes. The pressure was released and the contents were discharged into a centrifuge for separation. After 15 minutes of centrifuging, a sample of the free-flowing treated particles was placed in a heating oven set at 110° C. for 15 minutes to ascertain the amount of pentane absorbed in the process. It was found that the particles had a concentration of 8% pentane. Another sample was placed in boiling water to yield a foam having a density of 1.09 pounds per cubic foot. A larger sample was dry blended with a nucleating agent and extruded to foamed sheeting having a density of 19.8 pounds per cubic foot.

*Example II*

2,270 grams of polystyrene having a molecular weight of 58,000 to 65,000 was dry blended with 22.7 grams of finely divided calcium silicate, and thereafter charged to a 3 gallon autoclave equipped with an agitator under anhydrous conditions. A 26 inch Hg vacuum was drawn for ½ minute to remove air from the system. 2,270 grams of pentane were vacuum drawn into the autoclave and the autoclave was gradually heated to 40° C. while a pressure of 40 p.s.i. was applied with nitrogen gas. After 1 hour at these conditions, the autoclave was cooled to 24° C. and the contents of the autoclave were discharged into a centrifuge. The material was centrifuged for 20 minutes. A small sample was placed in a heating oven at 110° C. yielding 9.7% pentane concentration, while another sample was placed in boiling water to give a foam having a density of 1.0 pound per cubic foot. A larger sample was dry blended with sodium bicarbonate as a nucleating agent and extruded into cellular sheeting having a thickness of 10–35 mils and a density of 10–15 pounds per cubic foot.

*Example III*

2,420 grams of polystyrene having a molecular weight of 48,000 to 55,000 were dry blended with 24.2 grams of finely divided magnesium silicate and then charged to a 3 gallon jacketed autoclave under anhydrous conditions.

A 26 inch Hg vacuum was drawn 3 times to remove air 2,420 grams of normal pentane were drawn into the autoclave. The autoclave was gradually heated to 40° C. and a pressure 40 p.s.i. was applied with pressurized nitrogen gas. After one hour under these conditions, the autoclave was cooled to 23° C. in 5 minutes. The pressure was released and the mixture was centrifuged for 15 minutes. A small sample was placed in a heating oven at 110° C. yielding 12% pentane concentration, while another sample was placed in boiling water yielding a density of about 0.7 pound per cubic foot.

I claim:

1. Process for the preparation of expandable particulate styrene polymer which comprises coating the particulate styrene polymer with a finely divided, inorganic, anhydrous siliceous material having a particle size less than about 150 microns, reducing the ambient pressure on the coated particulate polymer to substantially below atmospheric, admixing a low boiling liquid hydrocarbon non-solvent for the styrene polymer having a boiling point below the softening temperature of the styrene polymer with the coated particulate polymer under anhydrous conditions, heating the resulting mixture to a temperature between about 35° C. and 65° C., but below that temperature which causes particle agglomeration while maintaining said heated mixture under a pressure of from about 30 to 60 pounds per square inch until at least about 1 percent liquid hydrocarbon has been diffused into the particulate polymer, and thereafter removing the excess hydrocarbon and recovering the expandable particulate styrene polymer.

2. Process as defined in claim 1 wherein the amount of liquid hydrocarbon which has diffused into the particulate polymer is from about 3 to 8 percent by weight.

3. Process as defined in claim 1 wherein the liquid hydrocarbon is an aliphatic hydrocarbon.

4. Process as defined in claim 1 wherein the liquid hydrocarbon is a cycloaliphatic hydrocarbon.

5. Process as defined in claim 1 wherein the finely divided, inorganic, anhydrous siliceous material is present in amounts of from about one-half to five percent by weight.

6. Process as defined in claim 1 wherein the siliceous material is a metal silicate.

7. Process as defined in claim 1 wherein the siliceous material is a silica.

8. Process as defined in claim 1 wherein the siliceous material is a siliceous aluminate.

9. Process for the preparation of expandable particulate styrene polymer which comprises coating the particulate styrene polymer with a finely divided, inorganic, anhydrous siliceous material having a particle size of from 0.001 to 100 microns, reducing the ambient pressure on the coated particulate polymer to substantially below atmospheric, admixing, under anhydrous conditions, a low boiling liquid hydrocarbon non-solvent for the styrene polymer having a boiling point below the softening temperature of the styrene polymer with the coated particulate polymer, heating the resulting mixture to a temperature between about 35° C. and 65° C., but below that temperature which causes particle agglomeration, while maintaining said heated mixture under a pressure of from about 30 to 60 pounds per square inch until at least 1 percent liquid hydrocarbon has been diffused into the particulate polymer, and thereafter removing the excess hydrocarbon and recovering the expandable particulate styrene polymer.

10. Process as defined in claim 9 wherein the amount of liquid hydrocarbon which has diffused into the particulate polymer is from about 3 to 8 percent by weight.

11. Process for the preparation of expandable particulate polystyrene which comprises coating particulate polystyrene with a finely divided, inorganic, anhydrous siliceous material, having a particle size less than about 150 microns, reducing the ambient pressure on the coated particulate polystyrene to substantially below atmospheric, admixing liquid pentane with the coated particulate polymer, heating the resulting mixture to a temperature between about 35° C. and 65° C., but below the temperature which causes particle agglomeration, maintaining said heated mixture under an inert gas pressure of from about 30 to 60 pounds per square inch until at least about 1 percent liquid pentane has been diffused into the particulate polystyrene, and thereafter removing the excess pentane and recovering the expandable particulate polystyrene.

12. Process as defined in claim 11 wherein the amount of liquid pentane which has diffused into the particulate polymer is from about 3 to 8 percent by weight.

13. Process as defined in claim 11 wherein the finely divided, in organic, anhydrous siliceous material is present in amounts of from about one-half to five percent by weight.

14. Process as defined in claim 11 wherein the siliceous material has a particle size from 0.001 to 100 microns.

15. Process as defined in claim 11 wherein the siliceous material is a metal silicate.

16. Process as defined in claim 11 wherein the siliceous material is a silica.

17. Process as defined in claim 11 wherein the siliceous material is a siliceous aluminate.

References Cited by the Examiner

UNITED STATES PATENTS

| | | | |
|---|---|---|---|
| 2,983,692 | 5/1961 | D'Alelio | 260—2.5 |
| 3,084,126 | 4/1963 | Carlson et al. | 260—2.5 |
| 3,086,885 | 4/1963 | Jahn et al. | 260—2.5 |
| 3,104,196 | 9/1963 | Shannon | 117—100 |
| 3,175,985 | 3/1965 | Lightner et al. | 260—2.5 |

MURRAY TILLMAN, *Primary Examiner.*

N. F. OBLON, *Assistant Examiner.*